United States Patent [19]

Hakamada et al.

[11] Patent Number: 4,607,949
[45] Date of Patent: Aug. 26, 1986

[54] PHOTOGRAPHIC PRINT MAKING METHOD

[75] Inventors: Haruo Hakamada; Tadashi Amano; Hiromitsu Kamiyama, all of Hino, Japan

[73] Assignee: Konishiroku Photo Industry Co., Ltd., Tokyo, Japan

[21] Appl. No.: 636,149

[22] Filed: Jul. 31, 1984

[30] Foreign Application Priority Data

Aug. 9, 1983 [JP] Japan ................................ 58-144437
Oct. 14, 1983 [JP] Japan .......................... 58-158131[U]

[51] Int. Cl.⁴ ....................... G03B 27/52; G03B 27/32
[52] U.S. Cl. ........................................ 355/40; 355/74; 355/77
[58] Field of Search ....................... 355/77, 40, 46, 53, 355/54, 74, 79, 125, 41; 354/76, 123

[56] References Cited

U.S. PATENT DOCUMENTS

| | | | |
|---|---|---|---|
| 3,677,638 | 7/1972 | Daugherty | 355/74 |
| 4,080,069 | 3/1978 | Pollina | 355/74 |
| 4,417,810 | 11/1983 | Ueda et al. | 355/40 X |
| 4,435,076 | 3/1984 | Tatsunosuke | 355/41 |
| 4,468,116 | 8/1984 | Miyaska | 355/54 |

FOREIGN PATENT DOCUMENTS 104918 2/1977 Japan.

Primary Examiner—L. T. Hix
Assistant Examiner—Della Rutledge
Attorney, Agent, or Firm—Jordan B. Bierman

[57] ABSTRACT

A photographic printing method include the steps of entering information into a storage medium as to location of each of a plurality of image frames on a negative film to be printed, entering data into said storage medium as to the desired print position of each of a selected number of said frames, and controlling a negative film transporting means and a printing paper moving means based on said information and said data to independently locate each of said selected number on said paper.

8 Claims, 22 Drawing Figures

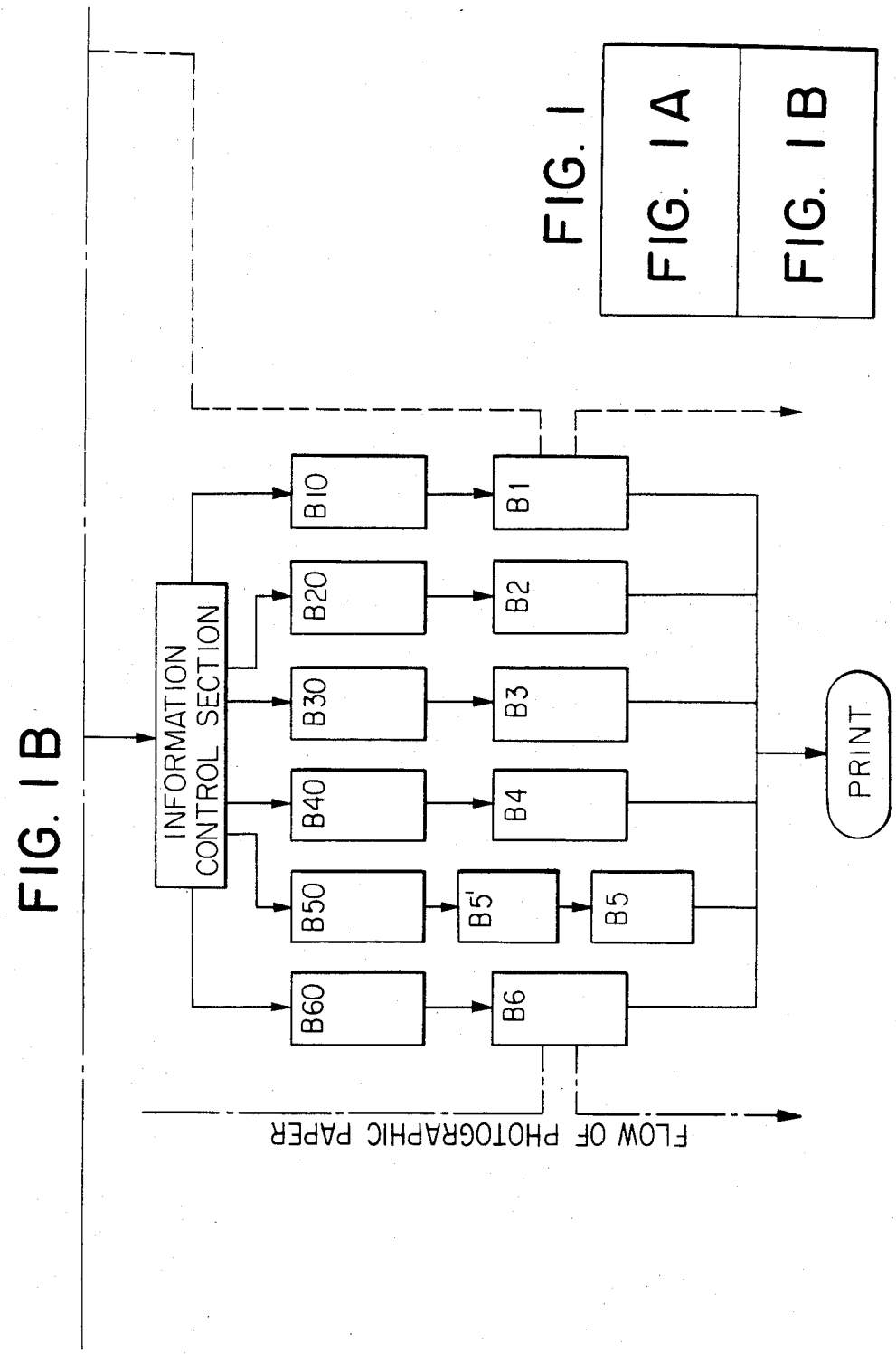

FIG. 2(A)　FIG. 2(B)　FIG. 2(C)
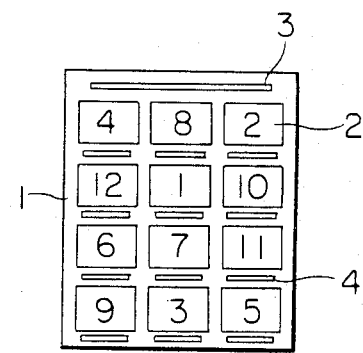
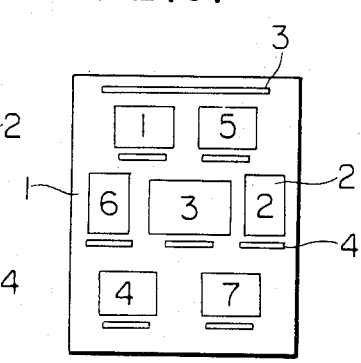
FIG. 2(D)
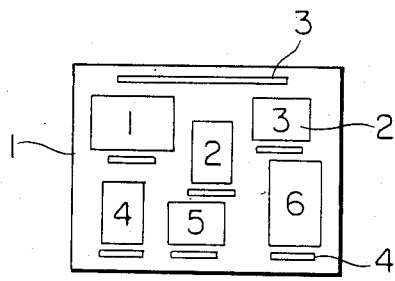
FIG. 2(E)　　　　　　FIG. 2(F)
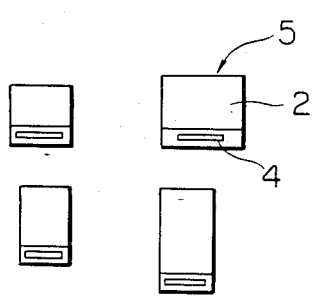
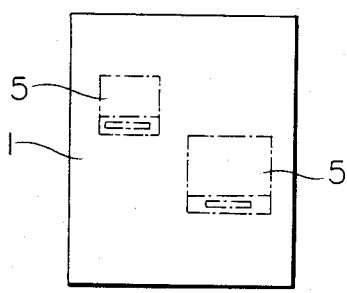

FIG. 9
FIG. 10(A)   FIG. 10(B)
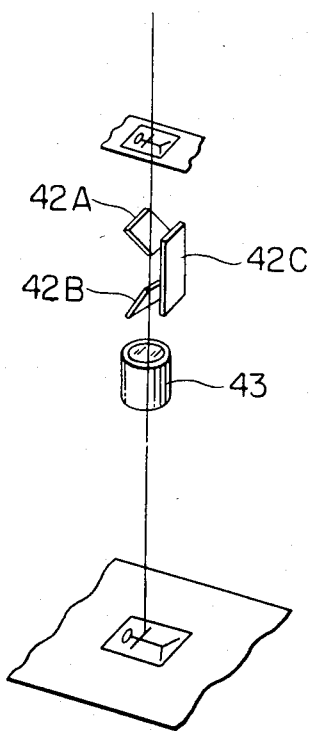
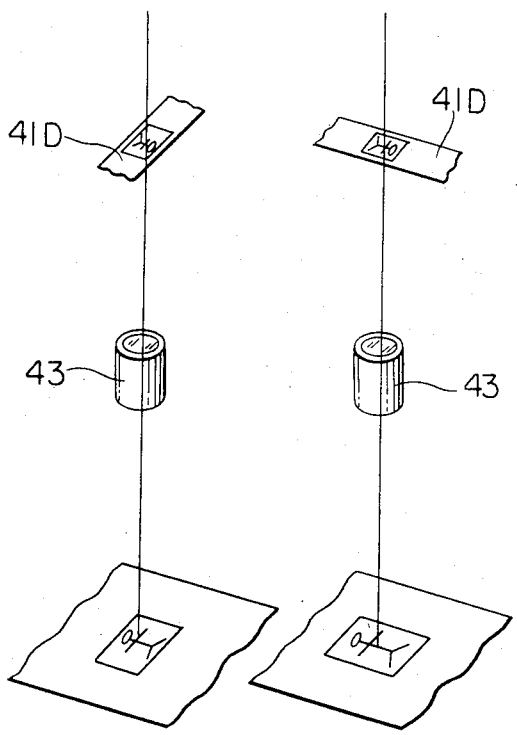

PHOTOGRAPHIC PRINT MAKING METHOD

BACKGROUND OF THE INVENTION

1. Field of the Invention

This invention relates to a method of making photographic prints in which a plurality of photographs (scenes) taken on a photo negative film and, if necessary, the explanatory captions thereof are printed together on a sheet of photographic printing paper.

2. Description of the Prior Art

Certain devices are already known for printing a plurality of photographic images on a sheet of photographic printing paper and using the printed paper itself as a sheet of mount for the photographs. {See, for example, Japanese Patent Publication Open to Public Inspection (hereinafter called Japanese Patent O.P.I. Publication) No. 104918/1977}. In the devices, however, every print must be the same in size and printed in its own designated position, and it is, therefore, unable to change the lay-out of photographs freely to order.

Accordingly, there have been the demands for such a method that photographs can readily be printed so that the sizes and lay-outs of the prints and, if necessary, the captions thereof may be designated to order. (Such prints are hereinafter called Layout-free prints).

OBJECTS AND SUMMARY OF THE INVENTION

This invention was materialized by paying attention to the facts that layout-free prints may inexpensively be provided and that the demands for the additional prints will be increased and, in turn, the bottom of the photographic culture will also be increased, if such layout-free prints may be made by an automatic printing means.

It is, accordingly, primary object of this invention to provide a novel method of making such layout-free prints, and to be more concrete, it is the object thereof to provide a method of making photo prints by means of an automatic printing mean by which a plurality of photographic images (such as scenes) and the captions thereof ar printed or imprinted on a sheet of printing paper in accordance with the information given to order such as the information of the frames of a negative film to be printed, the format information of a layout such as the arrangement of print positioning and the selection of print sizes, and, if necessary, the explanatory information of every photograph to be printed.

BRIEF DESCRIPTION OF THE DRAWINGS

FIGS. 1A and 1B is a block diagram illustrating the system of processing the layout-free prints relating to this invention;

FIGS. 2(A)-2(F) is a plan view illustrating the examples of layout cards;

FIGS. 8(A), 8(B), 8(C), through 10(A), 10(B) inclusive, are schematic representation each of an example of a print direction changing means.

DETAILED DESCRIPTION OF THE INVENTION

Next, the outline of users' requests relating to such layout-free prints and how to meet the requests will be described hereunder.

A. Requests relating to Layout-free Prints

A1: Layout-free print is that a plurality of photographic images (scenes) are printed on a single sheet of printing paper, in the state of completion thereof and that the sheet of printing paper is to serve as a photograph mount of an album. It is accordingly desired that a plurality of printing papers are ready to use in the prescribed sizes.

A2: It is also desired that photographic images to be printed may freely be selected from a plurality of photographic images framed in a developed film.

A3: It is desired that the print-sizes of every scene may freely be designated.

A4: It is desired that the configuration of print-frame may freely be designated such as the square, circular, heart-shaped as well as the conventional rectangular ones.

A5: It is desired that the number of letters such as printed or imprinted illustrative captions may be as many as possible, and the sizes of letters may freely be designated. In addition, it is desired that the selections of a variety of characters, arabic or roman numerals, the other characters, marks and symbols, and calligraphic styles, may be made as wide as possible. It is also desired that a hand-written illustrative caption may also be printed or imprinted.

A6: It is desired that such prints may be supplied as inexpensive as possible.

A7: it is desired that every finished prints may be delivered same if possible or the next day at latest, upon receipt of order, so that a speedy service may be secured.

The abovelisted are probably requested to Layout-free prints, and at the same time it is necessary to satisfy the various requirements such as proper exposure conditions, maintenance of color balance, erroneous printing prevention and speedy printing which are required in an ordinary photoprinting operation.

Figure 1A:
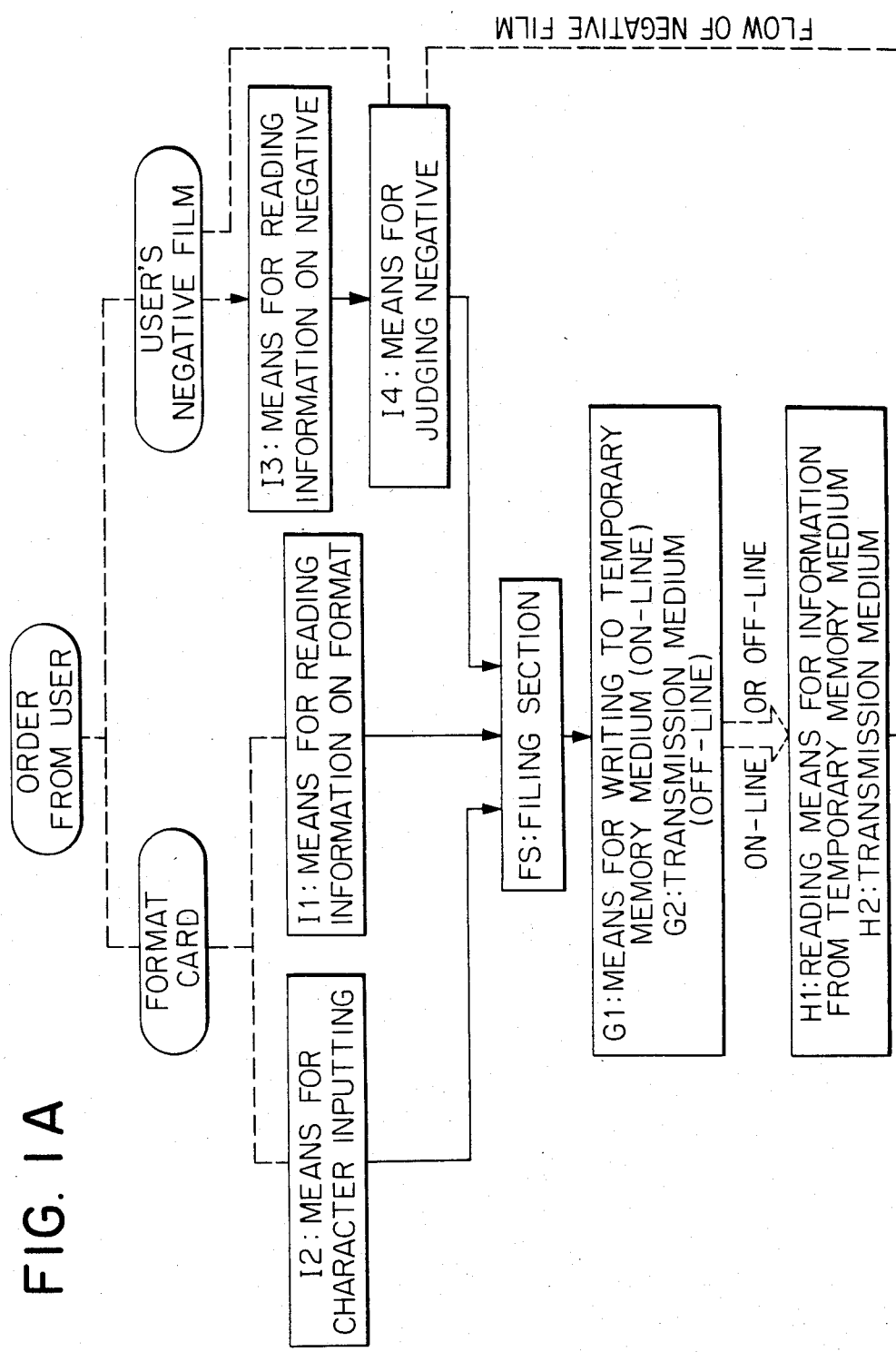

Next, the concepts of the hardware and software of the automatic photoprintng apparatuses which satisfy the abovementioned requirements will be described with reference to FIG. 1.

B. Hardware (Photoprint Processing Mechanism)

An automatic photoprinting apparatus capable of obtaining the abovementioned layout-free prints should be provided with a peculiar mechanism for layout-free printing as well as an ordinary mechanism for printing on request. These mechanisms include, for example, the following means;

B1: Negative film transport means,
B2: Print magnifying means, Printing direction changing means, and Printing frame designating means,
B3: Two dimensional moving means for a print system,
B4: Exposure means,
B5: Character printing or imprinting means,
B5': Character generating means, and
B6: Printing paper transport means.

These mechanisms have the following control sections for controlling the abovementioned means B1 to B6;
B10: Negative film transport controlling section,
B20: Magnification/Direction controlling section,
B30: Position controlling section,
B40: Exposure controlling section,
B50: Character generation controlling section, and
B60: Printing paper transport controlling section.

C. Software (Information preprocessing for performing a photoprinting process)

These are the technical means for layout-free printing by means of the abovementioned automatic photoprinting apparatus. These technical means include,
a means of format information designated by a user (including a print position, print size, print direction and print frame designation if a circular or heart-shaped frame besides an ordinary circular frame, can be selected as a print frame,
a means for character input such as the illustrative caption of a photograph, and
a means of reading a negative film information,
so that the preprocessing process for printing a photograph can be arranged by systematically operating the correlative mean to each other.

The hardware and the software are organically related to each other in accordance with the requirements of the abovementioned layout-free prints. It is a matter of course that, when a condition is provided, the automatic photoprinting apparatus may be good enough to have only the function capable of satisfying the corresponding tasks, but may not be necessary to satisfy more than those tasks. For example, if the conditions for the layout-free prints are provided as follows;
(1) Printing paper is limited to only one prescribed size.
(2) Negative film to be printed on a sheet of printing paper is limited to only one prescribed size, but any different size of negative film is not mixed in.
(3) Number of prints printed on a sheet of printing paper is limited to not more than 15 prints, provided that not more than 5 to 6 prints are likely to be suitable when the printing paper is used for a photograph mount, and among them specific number of prints may be in a different size, e.g., larger size.
(4) The configuration of print frame is limited to either the rectangular on the square.
(5) Number of imprinted or printed letters is limited to not more than 20 letters in English, for example,
it is then possible to simplify the abovementioned hardware and software considerably. Therefore, the abovementioned requirements probably proposed by users are merely the exemplification thereof, provided that the requirements beyond those exemplified above shall also be subject to the layout-free prints of the invention.

Next, the procedure of layout-free prints will be described with reference to a concrete example.

(1) Acceptance of an order 1-1. Film to be printed to order is received from a user and the frames to be printed are designated by the user.

1-2. Designation of print format is received from the user, such as how to arrange the designated frames (i.e. the designated scenes), and how to select the size of prints.

1-3. Designation of the illustrative captions of photographs is given by the user.

When receiving the abovementioned format information, such an order-form as shown in FIGS. 2(B) to 2(D) is used.

FIG. 2(A) shown a developed film put in a negative film envelope which is brought in by a user with him. Normally, the frames to be printed are designated by putting the negative film envelope with serial numbers corresponding to the frames as shown in FIG. 2(A) in which the numberals indicate only the scene designated to print. FIGS. 2(B) to 2(D) illustrate the order-forms respectively, in which the arrangements of scenes are freely designated, but the positioning and print magnification of frames are regulated. FIG. 2(F) illustrates a mount for layout card (E) on which an arbitrary layout of the frames may be determined. FIG. 2(B) illustrates an order form whose mount 1 is printed thereon columns 2 each in which a number corresponding to a negative film frame number is put down column 3 for putting a title down, columns 4 each for putting down the illustrative caption and the like. This example shows that every 12 scene is to be printed in the same size on a single sheet of printing paper as designated in columns 2. FIG. 2(C) illustrates an order form for designating thereon the number of prints, the arrangement of prints, and the sizes of prints such as the longitudinally and laterally rectangular prints mixed together, which are different from those shown in FIG. 2(B). FIG. 2(D) shows an order form to be used in the case of arranging the layout on a sheet of printing paper in the lateral rectangular form. These FIGS. 2(B) through 2(D) show the ready-made order blanks in different formats so that a user can select a print arrangement as he likes. FIGS. 2(E), 2(F) show that a various ready-made layout-cards 5 each are printed thereon with column 2 for putting down the number corresponding to a number of negative film frames (hereinafter called simply a negative frame number) and column 4 for putting an illustrative caption down, and the layout-cards 5 are pasted on a sheet of mount 1, so that a user may be able to select a layout freely. Layout cards 5 to be pasted on mount (F) are used as same as the order forms shown in FIGS. 2(B) through 2(D), with the same purpose, and hereinafter both of them will be regarded as the same. It is not necessary to be the same size between the sizes of such a order-form, layout-card or mount and the sizes of such a printing paper serving as a mount of a completed album.

Anyway, every format information, negative film frame number, etc. are stored in a suitable reading or memory means. These information are utilized in the movements or controls of a relative optical system control means, a film transport means and the like when printing.

The kinds and number of characters to be put down in columns 3 and 4 relate to a hardware of which will be described later.

If characters and numerals are limited to use up to 20 letters, for example, an imprinting or printing mechanism could be simplified considerably in the hardware. A designation of layout such as a print positioning and print size or an illustrative caption may also be accepted by means of such a character processor as a word-processor or such an image display unit as a CRT display, besides the aforementioned order-form or layout-card. In this case, a variety of display image information corresponding to the abovementioned order-form information are inputted in advance as the ready-made data, so that a suitable one can be selected by a user through the displays, and at the same time, only the illustrative captions are inputted by means of the word-processor.

Figure 3:
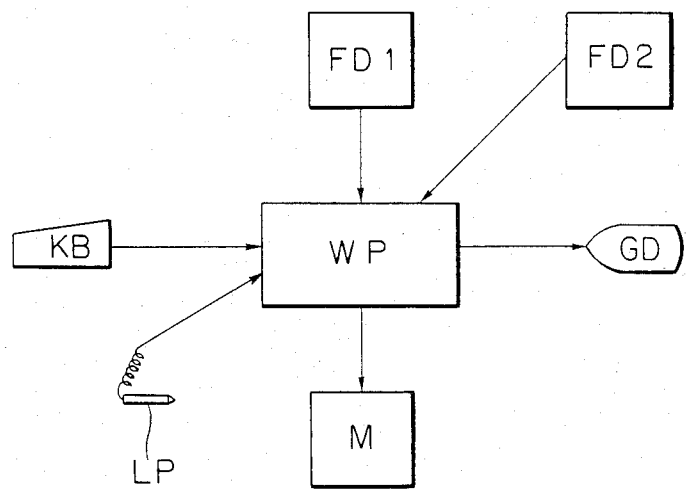
FIGS. 3 and 4 are block diagrams of the receiving means to which this invention is applied respectively.

Referring to an example of accepting an order for layout prints by means of a word-processor, as illustrated in FIG. 3, various samples of order-forms {see FIGS. 2(B) through 2(D)} are inputted in advance from basic floppy disk FD1 or a separate floppy disk FD2 into word-processor WP, so that a sample of the order-forms can be specified on graphic display GD such as a CRT display by operating key-board KB. Next, a frame to be printed of an order-form is selectively designated by a light-pen or the like and the corresponding negative frame number and the illustrative caption thereof are inputted. In this case, if the inputting order of printing frame information is predetermined, for example, if the order of negative frame numbers or of columns is predetermined in the case of using such an order-form as shown in FIG. 2(C), then it becomes unnecessary to use any light-pen or the like to designate the positioning the prints. Further, if a sample of ready made illustrative captions in called from basic floppy disk FD1 or from separate floppy disk FD2 in parallel with the abovementioned operation, such illustrative caption may suitably be arranged in the neighborhood of the corresponding photoprint.

When all the abovementioned procedures are completed, the inputted information are finally checked up on the graphic display and are then filed in outside storage medium M such as a minifloppy disk, a magnetic tape or the like.

(2) Preprocessing of prints 2-1. Reading and Inputting a format information

When an order for prints are not accepted by the abovementioned character processing unit, image display unit or the like, but by the order-forms or layout cards shown in FIGS. 2(B), 2(C), 2(D) and 2(F), a format information is read and inputted according to the order-form or layout-card in which the format information are put down by means of such an image display unit as a CRT display or such a character processing unit as a word-processor being operated by an expert operator. In this case, how to simplify the procedure is, for example, that a classification number, etc., (which is indicated by 100–300 in the upper left corner of each drawing) is designated by operating key-board KB, so as to select a format pattern from an order-form stored in advance in a floppy disk or the like.

In the case of using such a layout-card as shown in FIGS. 2(E) and 2(F) by which a user can freely select a layout, it is possible to read a layout-card and a format information or negative frame number on a mount when using a digitizer, for example.

Digitizer is a tablet type information inputting apparatus having a two-dimensional co-ordinates reading function. This apparatus notifies a computer a point having the co-ordinates which are found by touching a flat plate with a special pen.

Figure 4:
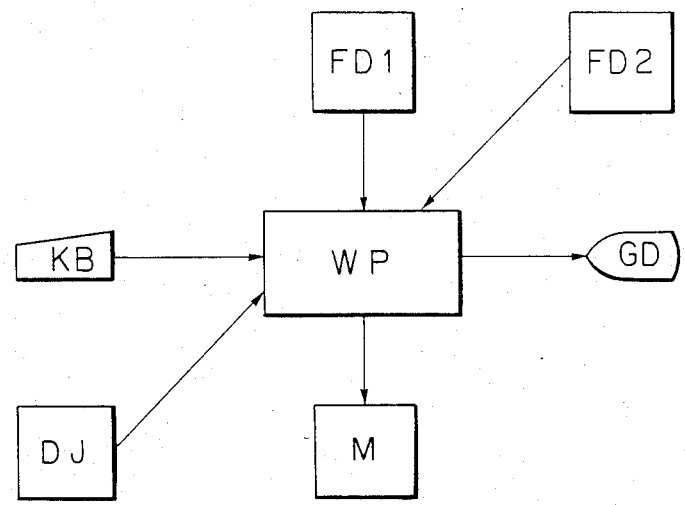

FIG. 4 illustrates an example in which a negative film information and a format information are inputted by means of a digitizer. In this drawing, each reference numeral indicates the same member as that shown in FIG. 3, and DT is the abovementioned digitizer. When a negative film number and a frame number are inputted by digitizer DT, firstly, a negative film number is inputted by operating key-board KB and the negative film is placed onto a designated position on digitizer DT, and then the point on the negative film is designated, and thereby a verifying operation is automatically carried out between the configuration of a cut negative film stored in advance in the digitizer and the position of each negative frame of the cut negative film, and thus the position is read.

The next is to read the format information. Layout-card 5 pasted on a mount is placed in a designated position of digitizer DT, and one point on the vertical line of layout-card 5 and another point on the horizontal line thereof are indicated in an actual configuration, and thus digitizer DT may be able to calculate all the information such as the size of the configuration (i.e., a print size), the position or center of a figure including a print position and the center of an exposure, a longitudinal or lateral format print and the like.

2-2. Input of characters

Information of characters and the filling up (or imprinting) positions thereof which are put down respectively in title column 3 and illustrative caption columns 4 shown in FIG. 2; such information are inputted in word-processor WP by such a well-known inputting means as a tablet input means, an OCR input means or a key-input means including the KB input means shown in FIGS. 3 and 4.

2-3. Input of negative film information

This is an input of a negative film (frame) number and the like designated by a user. Generally, a film to be printed on order is cutt off every 3 to 6 frames. Therefore, an information of a frame number is, namely, an information of the distance from the leading end of a cut film to a designated frame. The movement and positioning of a specific frame to the negative film masking position of the exposure section of a photoprinter are precisely determined according to the abovementioned distance information and an information of the location of the center of the specific frame found out by one of the notches usually provided in the center of every frame for the designation of a scene to be printed.

In one of the concrete examples of the negative film frame inputting means, the information of positioning a negative film frame to be printed may be good enough to input by a digitizer DT.

2-4. Judgement of negative film

Judgement of negative film is to manually or automatically judge, input and store a variety of image information including, for example, a color compensation information such as a blue, green or red color density, an information of film kinds such as manufacturers, sensitivity and the like, an information of photographic light source, and the like.

Such negative film judgement may be carried out in and with a variety of well-known procedures and means respectively. Namely, (a) In the manual judgements, an operator visually judges the image of a negative film frame and then inputs the compensated data thereof. Every information may be inputted by any well-known information inputting means such as a key-inputting means, tablet inputting means, OCR inputting means or the like.

(b) In the automatic judgements, a negative film is automatically judged by utilizing a color-analyzer or the like. Negative film judging means usable for this purpose include, for example, such a one as an automatic image judging means disclosed in Japanese Patent O.P.I. Publication No. 204537/1982, and such a one adopting therein a well-known negative film scanning method in which a negative film surface is scanned by a flying spot or the like, and (c) In the negative film judgements using a print-simulation method, the image of a frame is observed so as to determine a color-compensation value and the like by making use of a positive-image observing unit or the like to serve as a print-simulator using a monitoring TV or the like, of which Japanese Patent Application Nos. 209320/1982 and 209321/1982 have disclosed.

These information of the judgements obtained by the abovementioned negative film judging means are sent together with the aforementioned character input information such as the print-format information, negative film number information, illustrative captions and the like, to an automatic photoprinting apparatus of which will be described later, by an on-line system or through a record medium.

2-5. Filing (1) Format information,
(2) character information,
(3) negative film information and
(4) negative film judgement information described respectively in the abovementioned 2-1 through 2-4 are filed in every order.

Further, in the case of an off-line, a writing and a reading are made to such a transmission medium as a magnetic tape, paper-made tape, floppy disk, bubble memory and the like. (G1, H1).

On the other hand, in the case of an on-line, a writing and a reading are made to a temporary storage medium through such a transmission medium as an optical fiber and the like. (G2, H2).

(3) Printing

When completing the abovementioned preprocesses and collecting all the information, a photoprinting operation is then commenced. An automatic photoprinting apparatus comprises, as described above, negative film transport means B1, print-frame designating means B2 capable of changing a print-magnification and a print direction, means B3 for two-dimensional movement of print system, exposure means B4, character printing or imprinting means B5, printing paper transport means B6 and control section B7 for controlling the abovementioned means.

The concrete compositions thereof will be described in order.

B1: Negative film transport means

Figure 5:
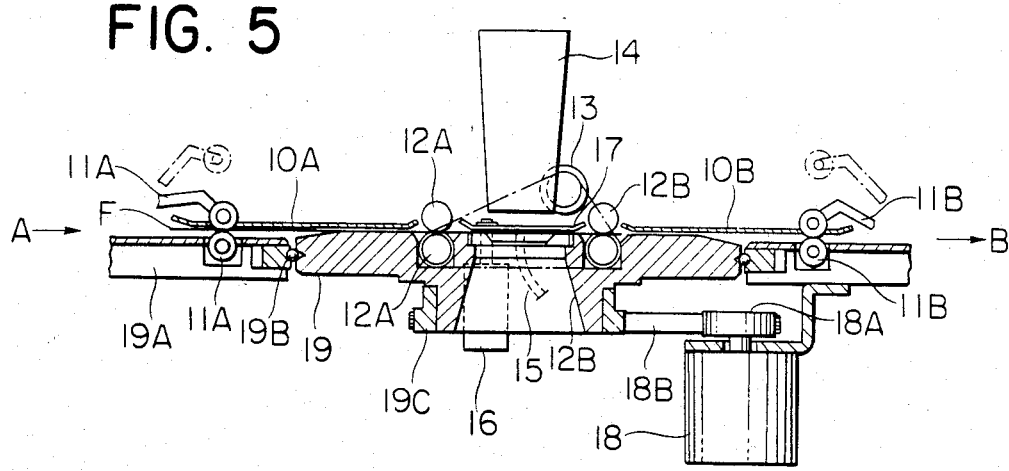
FIG. 5 is a partially sectional view illustrating an example of a negative film transport means.

FIG. 5 illustrates an example of negative film transport means, by which a cut film comprising six frames at a maximum is automatically transported. Cut film F is transported from the direction of arrow A by manual operation or an automatic supplying means (not shown) and, being regulated by transport guide 10A, it is fed onto the side of principal rollers 12A by film transport rollers 11A. The cut film F is also regulated in the direction of the width thereof by a suitable guide member so as to prevent it from a skew or zig-zag movement. By the revolution of principal transport rollers 12A, 12B operated by negative film feeding motor 13, the cut film F is transported to the exposure section over which lens barrel 14 is located. The exposure section is arranged with notch detector 15 which detects a notch of the cut film F. When the notch detector 15 detects the notch of a negative film frame to be printed according to the aforementioned negative film information, it stops the revolution of cut film transport rollers 11A and principal transport rollers 12A, 12B so as to determine the position of the frame to be printed. When completing the positioning, solenoid 16 for pressure-contacting the film frame is generated to descend pressure plate 17 and to fix the cut film F to the exposure section. An exposure is to be made in this state. In the case that a longitudinal photograph is taken in a film frame to make an angle of 90° to the regular photographing direction, that is, when taking a longitudinal photograph on a frame, negative film carrier turning motor 18 is operated to turn about the negative film carrier 19 so that the direction of the frame of the cut film F may be switched. In order to function as described above, negative film carrier 19 is designed in the shape of a disk and is fixed to negative film carrier fixing member 19A through ball-bearing mechanism 19B. Pulley 18A is fixed to the driving shaft of motor 18 so as to revolve pulley 19C which is fixed to the bottom of negative film carrier 19, through belt 18B. When the frames of cut film F are printed in order and all the frames of the cut film are printed out, the cut film is transported by the revolution of principal transport rollers 12A, 12B and cut film transport rollers 11B, while its travelling directions is regulated by transport guide 10B, so that the cut film can finally be ejected in the direction of arrow B. The cut film transport rollers 11A, 11B and principal transport rollers 12A, 12B are driven at the same circumferential velocity. In the negative film transport means illustrated in the drawing, the distance between cut-film transport rollers 11A and principal transport rollers 12A is so arranged as to be the length within the order of 114 mm that is the length corresponding to 3 full-size frames (i.e., 38 mm × 3 frames = 114 mm) or 95 mm that is the length corresponding to 5 half-size frames (i.e., 19 mm × 5 half-size frames = 95 mm). In addition, the distance between principal transport rollers 12A and 12B, and that between principal transport roller 12B and cut film transport roller 11B are similarly provided to be the abovementioned distance. The reason why the abovementioned distance is arranged is that a roll of film is, in nearly all cases, cut off every strip having 3 full-size frames or 5 half-size frames at a minimum. Assuming that the length of cut film F is for 6 full-size frames (38 mm × 6 = 228 mm) and that the first frame is in the exposure position, then, the leading edge of the cut frame is still on cut film transport rollers 11B. This means that negative film carrier 19 cannot be turned above in the state. Therefore, when revolving negative film carrier 19, cut film transport rollers 11A and 11B are let escape into the state shown by an alternate long and short dash line by a solenoid (not shown) or the like.

Further, the negative film carrier 19 of this example is interchangeable to those for the other kinds of films such as 110-size film, 126-size film and disk film. In this case, such a negative film carrier 19 may be so designed as to replace by the carrier body only or to replace by the body together with the chassis containing ball-bearing mechanism 19B.

Still further, it is also possible to turn about negative film carrier 19 by a manual operation instead of the automatic operation by means of a negative film carrier turning motor.

In the case of a disk film to be printed, a transport means for disk film (not particularly shown) is to be used. In this case, it is not necessary to use a digitizer which is used when reading the aforementioned negative film positioning information, but it is possible to input the negative film frame numbers indicated on a disk film simply by such a well-known means as a key, OCR or tablet type inputting means.

B2: Print magnification changing means

Figure 6A:
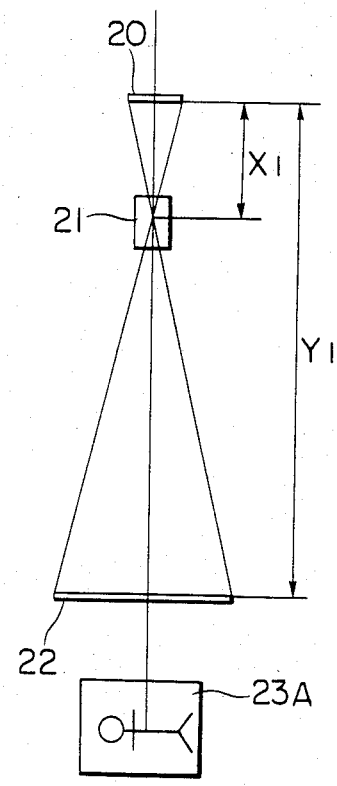
FIGS. 6(A) and 6(B) are schematic representation each of an example of a print magnification changing means.
Figure 6B:
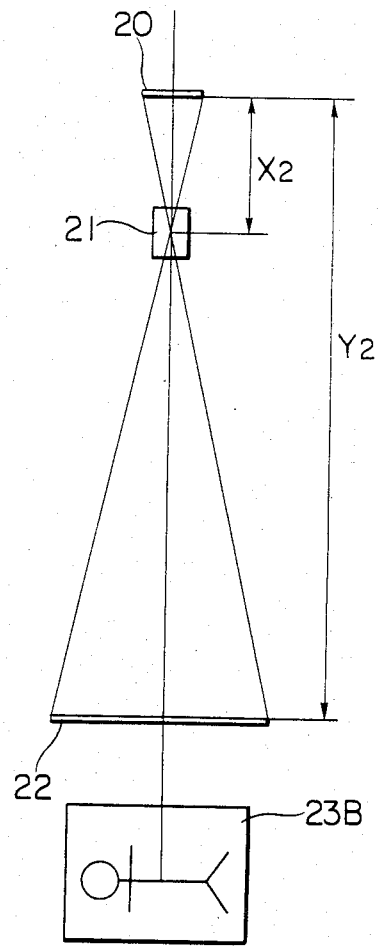
Figure 7:
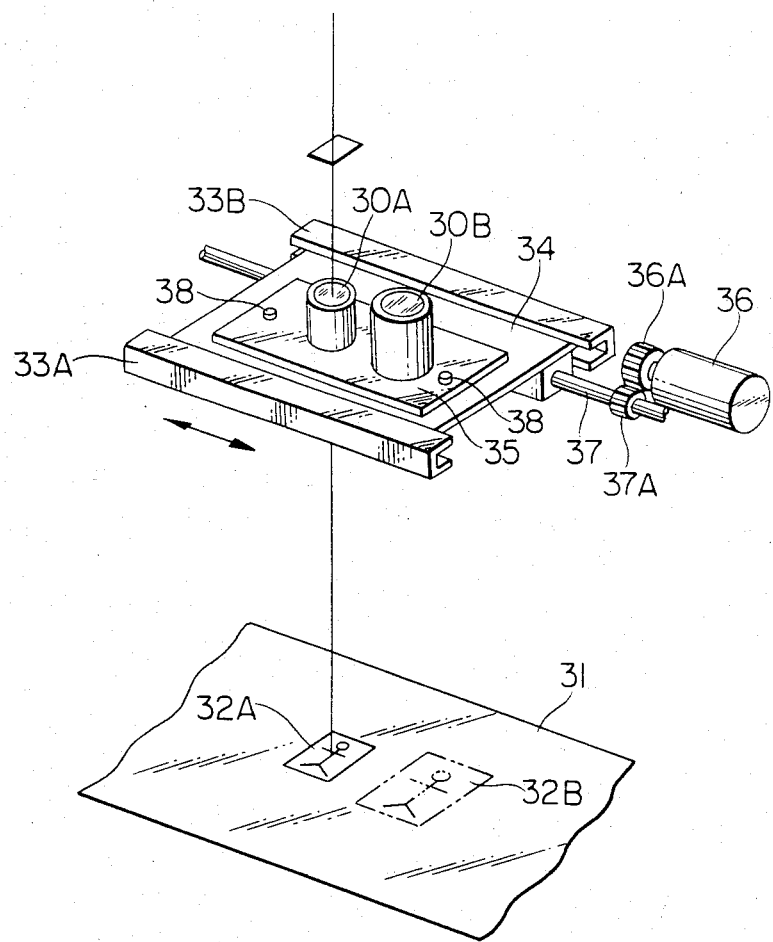
FIG. 7 is a perspective illustration of the same.

This means may be constructed in a variety of types, including, for example, (a) means in which an object distance is changed as shown in FIG. 6,
(b) means in which a lens is switched to the other as shown in FIG. 7,
(c) means in which a zoom-lens is used, and the like.

FIG. 6 illustrates a means in which an object distance is changed so as to change a print magnification. As shown in FIG. 6(A), if the distance between negative film frame 20 and lens 21 is $X_1$, picture image 23A is projected onto printing paper 22 which is at the distance of $Y_1$ from the negative film frame 20. If trying to obtain picture image 23B whose print magnification is different from that of picture image 23A, the distance between negative film frame 20 and lens 21 is set to $X_2$ by moving lens 21. In this system, any print magnification ratio may be selected by using a single piece of lens, however, it is required to use a mechanism capable of moving both of lens 21 and printing paper 22, and also to satisfy the following positional relation between the lens and printng paper;

$$1/X + 1/(Y-X) = 1/f$$

(f=a focal length).

The means illustrated in FIG. 7 is that is provided in advance with some kinds of lenses so as to automatically select one of them in accordance with a magnification information. There are many ideas on how to arrange such lenses and how to control the movement thereof. Among such ideas, FIG. 5 illustrates an example thereof, wherein, lenses 30A, 30B each project picture images 32A, 32B respectively onto printing paper 31, and the lenses 30A, 30B each are fixed, through a lens-board 35, to slidable plate 34 which is supported with guide members 33A 33B. Slidable plate 34 is engaged with ball-screw 37 so that the slidable plate 34 may be driven straight through a pair of gears 36A, 37A by motor 36. In the state illustrated in FIG. 7, lens 30A is in the exposure position. How to switch this lens to lens 30B is that ball-screw 37 is revolved by motor 36 and thereby the slidable plate 34 is moved along guide members 33A, 33B in parallel with the guide members. In this case, it is a matter of course that the operation of motor 36 is controlled by a control section which is indicated by B1 in FIG. 1, according to a print magnification information. In the case of the example shown in the drawing, the lens may be changed to the other kind of lens if the kind of negative film is changed to the other. For example, when a lens for 35 mm half-size frame now being set is to be changed to a lens for 35 mm full-size frame, lenses 30A, 30B are taken off together with lens mounting board 35 and in turn the lens for 35 mm full-size frame and lens mounting board 35 are set according to positioning pins 38. Further, to solve such a complicated procedure, it is also allowed that lens mounting board 35 is made in the disk shape and a group of lenses which are different in kinds and magnification power is arranged around one and the same circumference of the disk, as negative film carrier 19 shown in FIG. 3, then, one of the lenses may freely be selected to us in accordance with the information on print magnification and negative film sizes.

Besides the above, the print magnification changing means also include a means using a zoom lens though it is not shown therein. In this means, the zooming operation is automatically controlled in accordance with a magnification information and thereby a variety of print magnification may be selected with the use of a single piece of lens without changing a object distance. On the contrary, such a lens is relatively expensive and is somewhat inferior in the characteristics to normal types of lenses.

B2': Means for changing a print direction and for designating a print frame

(a) Means utilizing an image rotation lens

Figures 8A, 8B, 8C:
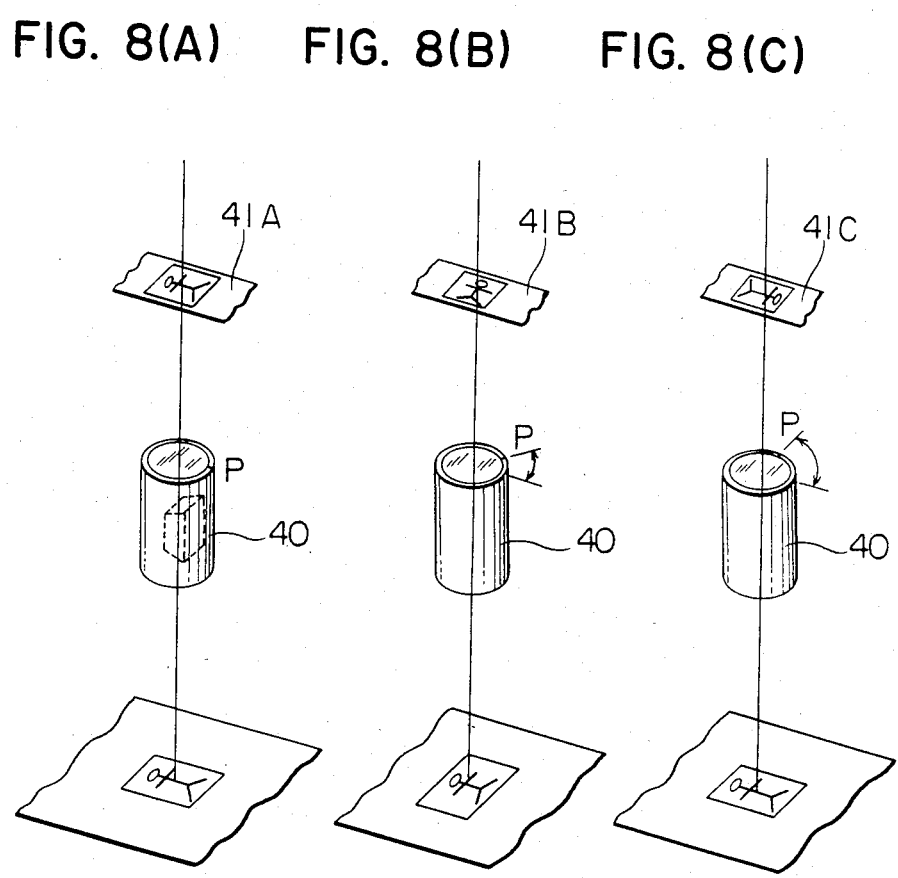

It is possible to utilize an image rotation lens disclosed in Japanese Patent 0.P.I. Publication No. 204535/1982 applied by the applicant of this patent application. According to such an image rotation lens as shown in FIG. 8, any print may be made in any direction as designated by a user on a lay-out card or on the mount of an order-form by controlling the revolution of image rotation lens 40, even if the image taken in a negative film frame should be in any direction. In other words, if each of images taken in the different photographed direction in a frame of negative film 41B or 41C is to be printed in the same direction as that of negative film 41A, the prints may be performed only by controlling image rotation lens 40 so as to rotate at every 45° or 90°, respectively. It is therefore do to merely control image rotation lens 40 so as to rotate at 45° as a unit.

(b) means utilizing a reflecting mirror control

As illustrated in FIG. 9, reflecting mirrors 42A, 42B and 42C are combined together so as to function as same at all as the abovementioned image rotation lens functions and to control the rotation in the same manner as described in the abovementioned paragraph (a). According to this method, there is an advantage that an ordinary type of lenses may be utilized as lens 43.

(c) Means utilizing the changes of the direction of a negative film

As illustrated in FIGS. 10(A), 10(B), this method is to change direction of a print by changing the direction of the arrangement of negative film 41D. Arrangement direction of the negative film may readily be changed by controlling the turning of negative film carrier 19 as illustrated in FIG. 5.

B3: Two-dimensionally moving means of a print system.

In order to make a print-position freely movable two-dimensionwise, the methods may roughly be classified into two, namely, one is to move sheet of printing paper, and the other is to move a negative film transport section or lens. Either method may be applied to perform a layout-free print.

Figure 11:
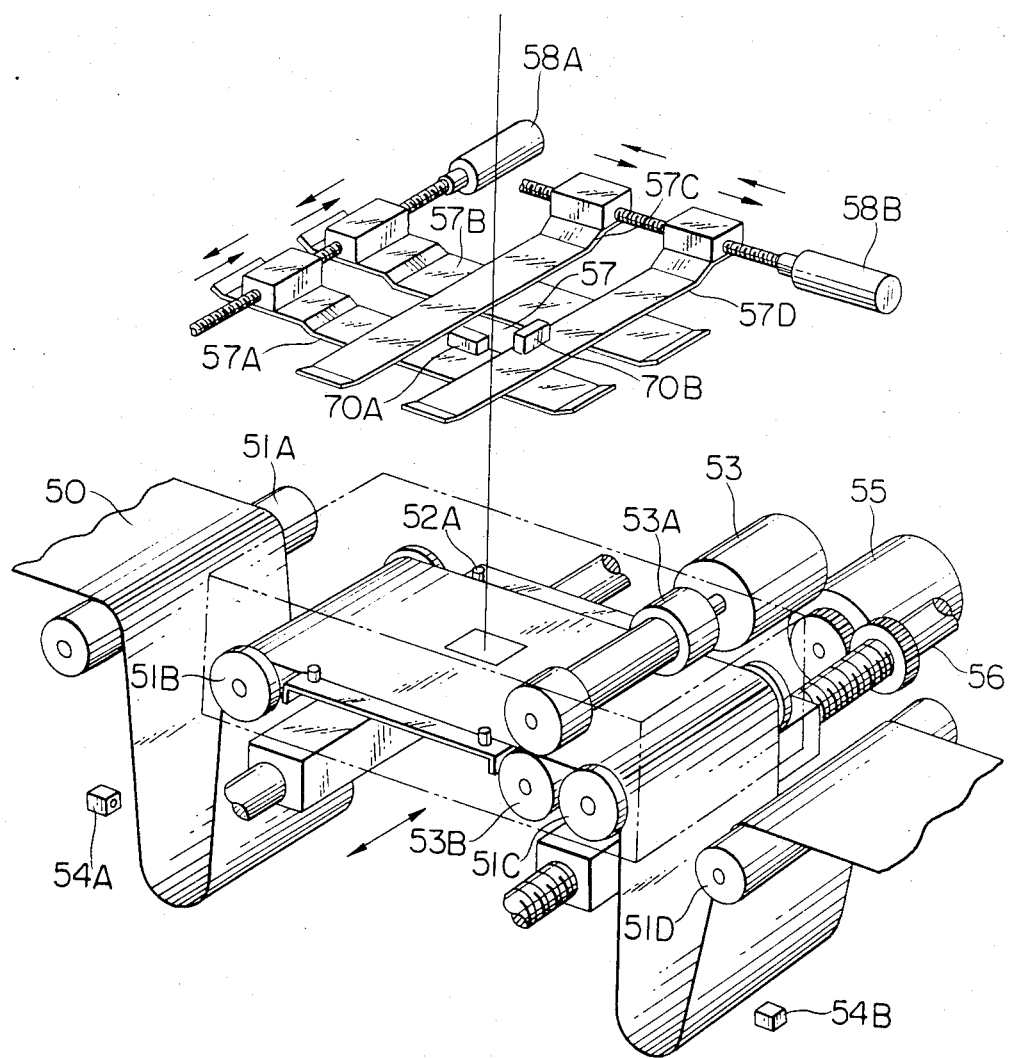
FIGS. 11 and 12 are perspective illustration each of an example of the two-dimensional moving means of a printing system.
Figure 12:
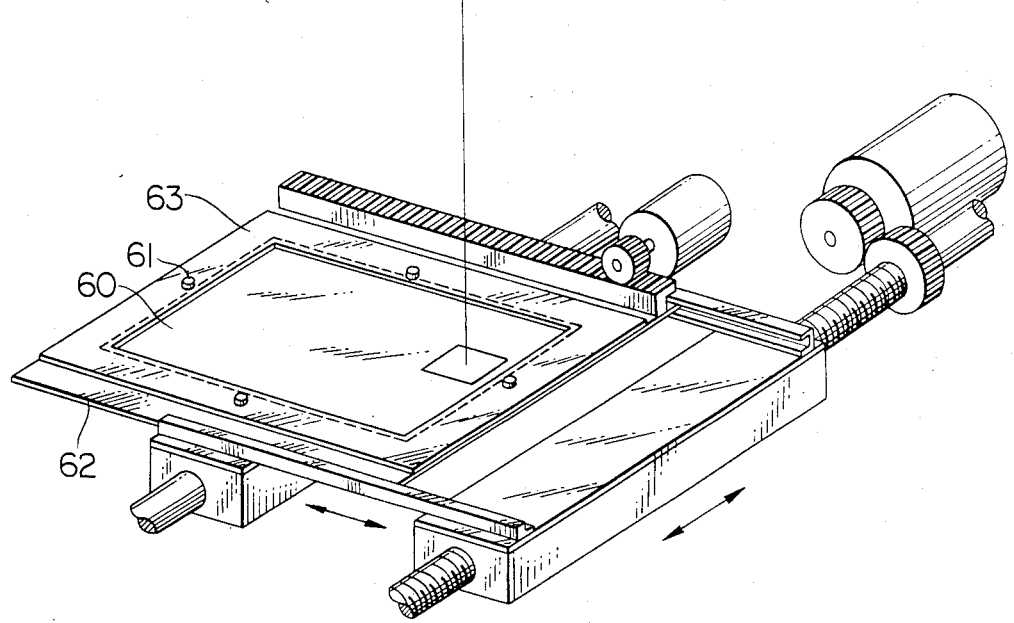

FIG. 11 illustrates an example of the two-dimensionally moving means of a print system used in the case of utilizing a roll of printing paper, and FIG. 12 illustrates an example thereof used in the case of utilizing a sheet of printing paper cut into a prescribed size.

In FIG. 11, printing paper 50 having been rolled round a reel (not shown) is guided to printing frame in the state that the printing paper 50 is formed into a first loop between guide rollers 51A and 51B, and being guided by positioning pin 52A of the printing frame and passing over paper transport rollers 53A, 53B being revolved by motor 53, and is then formed into the second loop between guide rollers 51C and 51D, so that the printng paper may be transported to a take-up device (not shown). The conditions of the first and second loops are checked up by accumulation sensors 54A, 54B. According to the information obtained by the accumulation sensors, the revolution of each sub-drive motor arranged to the upper-stream of guide-roller 51A and to the down-stream of guide roller 51D is controlled so that the loops may constantly be maintained in a given size. The constant size of the loops means the so-called size of a sag within the order of not damaging printing paper 50 when the unit indicated by alternate long and two short dashes lines is moved by the mechanism to be described later. Ball-screw 56 is coupled to the printing frame so as to revolved by motor 55 through a gear mechanism. The unit is reciprocated in straight lines by the regular or reversal revolution of motor 55 in accordance with format information received, and is controlled so that a frame to be printed may be positioned to the prescribed position of printing paper 50. If providing a pair of such mechanisms reciprocating the unit to one direction and to the direction shifted at an angle of 90°, respectively, the movements of the unit may be controlled two-dimensionally. In the embodiment illustrated in the drawing, the movement of printing paper 50 in the longitudinal direction is made by transport rollers 53A, 53B, but the unit is not moved two-dimensionally.

Numeral 53 indicates a paper mask comprising four pieces of thin plates 57A, 57B, 57C, 57D arranged each other to meet at right angles and controlled by motors or solenoids 58A, 58B to move in the direction of the arrow, and this paper mask may freely be formed in various directions and sizes according to the format information shown in FIG. 2. Such motor or solenoids 58A, 58B may be provided to every thin plate 57A through 57D.

FIG. 12 illustrates an example of the two-dimensionally moving means of a print system used in the case of utilizing a sheet of printing paper cut in a given size, in which a cut sheet of printing paper 61 is regulated to place in a position on base board 62 and is pressed by pressure plate 63 so as to be flat. Base board 62 comprises a mechanism similar to the mechanism for reciprocating the unit in straight lines described with reference to FIG. 11 and a rack-and-pinion mechanism in combination, so that the printing paper may be moved two-dimensionally. In this case too, such a paper mask forming means as illustrated in FIG. 11 is arranged over to the printing paper. In addition, after printing a photograph or printing or imprinting characters on the printing paper, the printing paper is ejected in the direction of the arrow by a paper transport means, and another new sheet of printing paper is supplied.

B5: Character printing or imprinting means

Character printing or imprinting section is arranged, namely, as 70A, 70B, to a part of the paper mask forming means illustrated in FIG. 11.

There are a variety of structures of character printing or imprinting section. There include, for example, one in which characters are generated according to a print or imprint information by a CRT display, an LED display, a prasma display, a liquid crystal display or the like and the generated characters are printed in a contact method, a projection method using an optical system or an image transfer method using an image fiber or the like, and another in which such generated characters are imprinted by an imprinting means being generally used in the printers of a word-processor or computer.

Further, it is not always necessary to imprint in a printing position, but it may also be performed within the wide range between the step after completing a photoprinting and the step after completing a print-washing and drying.

B6: Printing paper transport means

The means for transporting a roll of printing paper is different from that for transporting a cut sheet of printing paper. However, all the means capable of being applied to an ordinary type of automatic photoprinting apparatuses may be used, provided that a correction is made on the point that the width of printing paper becomes wide.

Referring to FIGS. 11 and 12, the transportion of printing paper in the printing position has been described.

This invention comprises as described above, so that the layout-free printng first described may effectively be performed.

What is claimed is:

1. A photographic printing method comprising
   a. entering information into a storage medium as to location of each of a plurality of image frames on a negative film to be printed;
   b. entering data into said storage medium as to the desired print position of each of a selected number of said frames;
   c. controlling a negative film transporting means and a printing paper moving means based on said information and said data to independently locate each of said selected number on said paper.

2. The method of claim 1 wherein there is a plurality of locations.

3. The method of claim 1 wherein said data includes the desired magnification of each of said selected number of frames.

4. A photographic printing method as claimed in claim 1, wherein a photographic image registered on a frame selected to be printed on a printing paper is changed in a different direction at an angle by means of an image rotation lens.

5. A photographic printing method as claimed in claim 3, wherein the photographic image registered on a frame selected to be printed on a printing paper is changed in the different direction at an angle by means of an image rotation lens.

6. A photographic printing method as claimed in claim 3, wherein the printing paper is two-dimensionally moved according to the format information.

7. A photographic printing method as claimed in claim 3, wherein the print magnification is changed by means of a zoom-lens.

8. A photographic printing method as claimed in claim 6, wherein a roll type of printing paper is used for the printing paper.

* * * * *